United States Patent
Mori et al.

(10) Patent No.: US 6,594,877 B2
(45) Date of Patent: Jul. 22, 2003

(54) METHOD AND EQUIPMENT OF RECYCLING USED-AUTOMOBILES

(75) Inventors: Toshio Mori, Fukuoka-ken (JP);
Seietsu Morimoto, Fukuoka-ken (JP);
Katsumi Eguchi, Fukuoka-ken (JP);
Tomio Kawasaki, Fukuoka-ken (JP);
Hirohumi Kamiota, Fukuoka-ken (JP)

(73) Assignee: Yoshikawa Kogyo Co., Ltd., Fukuoka-ken (JP)

( * ) Notice: Subject to any disclaimer, the term of this patent is extended or adjusted under 35 U.S.C. 154(b) by 0 days.

(21) Appl. No.: 09/818,106

(22) Filed: Mar. 27, 2001

(65) Prior Publication Data

US 2001/0035102 A1 Nov. 1, 2001

(30) Foreign Application Priority Data

Mar. 30, 2000 (JP) ........................................ 2000-095354

(51) Int. Cl.[7] ............................................... B23P 17/04
(52) U.S. Cl. .................... 29/403.1; 29/403.2; 29/403.3; 29/426.1; 29/426.3; 100/901
(58) Field of Search ............................. 29/403.1, 403.2, 29/403.3, 426.1, 426.3, 426.4, 426.5, 791; 100/35, 37, 901

(56) References Cited

U.S. PATENT DOCUMENTS

| | | | | |
|---|---|---|---|---|
| 4,905,363 A | * | 3/1990 | Boyenval | 29/403.2 |
| 5,080,291 A | * | 1/1992 | Bloom | 241/19 |
| 5,335,406 A | * | 8/1994 | Van Den Mosselaar et al. | 29/426.3 |

FOREIGN PATENT DOCUMENTS

| | | | |
|---|---|---|---|
| EP | 602556 A1 | * | 6/1994 |
| JP | 06262449 A1 | * | 9/1994 |
| JP | 11348855 A1 | * | 12/1999 |

* cited by examiner

Primary Examiner—Gregory Vidovich
Assistant Examiner—Jermie E. Cozart
(74) Attorney, Agent, or Firm—Jordan and Hamburg LLP

(57) ABSTRACT

A scrapping system of used-automobiles includes a reusable parts collecting station, a liquid collecting station for collecting liquids including fuel, oil and coolant, a prearrangement station for collecting chlorofluorocarbon, batteries, seats, tires, etc., a functional parts collecting station for collecting a suspension device, a non-ferrous metal parts and resin parts collecting station for collecting motors, harnesses, instrument panels, bumpers, etc., and a pressing station for pressing a body of the used-automobile which has been processed in the above stations. The stations are sequentially arranged.

9 Claims, 9 Drawing Sheets

METHOD AND EQUIPMENT OF RECYCLING USED-AUTOMOBILES

FIELD OF THE INVENTION

The present invention relates to a method and equipment of recycling used-automobiles, for scrapping a used-automobile to collect recyclable useful objects and subsequently pressing a body of the used-automobile.

BACKGROUND OF THE INVENTION

In view of effective resource utilization, energy conservation and environmental protection, recycling of resources has been recognized as one significant subject. As to automobiles, continuous efforts has been made to establish a recycle system wherein after collecting reusable parts or the like and removing harmful or hazardous objects or materials from used or damaged automobiles, a bared body (referred to as a body iron) is pressed by a soft press machine or other press machine to form an iron scrap serving as a raw material of steel, or the body iron is crushed to fragments by a shredding machine to fractionate and collect valuable metals.

In late years, increased usage rate of automobile parts containing disadvantageous materials to steel making, such as copper, causes a difficulty in applying the pressed material formed by pressing the used-automobiles as-is after collecting recyclable parts to a raw material for steel making.

Further, in the existing circumstances, since the recycle system in automobiles involves questions of economic viability in the scrapping process itself, it has been promoted with giving weight primarily to the recycling of disassembled parts. Thus, in order to improve scrapping efficiency and parts collection rate and to reduce the scrapping process cost, there has been disclosed one technique related to a scrapping process comprising the steps of (1) carrying a used-automobile in, (2) temporarily storing, (3) preprocessing, (4) taking off parts, (5) tearing down the used-automobile, (6) pressing a body, (7) temporarily storing, and (8) carrying out, i.e. a reverse process to that of assembling automobiles.

For example, Japanese Patent Laid-Open Publication No. Hei 10-16840 discloses a technique in which a platform having a certain height is provided with an opening serving as a transfer space for a scrapping line, a plurality of transfer carriages longitudinally movable along the scrapping line being provided as a transfer device for transferring a used-automobile between each scrapping station, each of the transfer carriages including a fork member vertically movable between higher and lower positions than the surface of the platform to serve as a table for transferring and processing the used-automobile, and a conveyer for carrying disassembled or removed parts out of the line and the like being provide on both sides in the longitudinal direction of the platform.

Japanese Patent Laid-Open Publication No. Hei 10-230822 discloses another technique comprising transfer carriages for automatically transferring a used-automobile from an operation station to a subsequent operation station with supporting the used-automobile thereon, and a lift for carrying out the operation in each station, wherein particularly in order to collect recyclable parts, reference cards are attached on the recyclable parts in a checking/sorting station, and each scrapping operation is carried out based on the reference cards in each subsequent operation station.

Japanese Patent Laid-Open Publication No Hei 11-78810 discloses still another technique comprising an overhead crane type traveling device reciprocatable along a transfer path, and a vertically movable lift provided at lower section of the traveling device, wherein a used-automobile is supported by the lift at an optimum height for scrapping operations, and an extracting station for extracting liquid such as waste liquid or waste oil and a disassembling station for disassembling or retrieving recyclable parts are separately carried out.

Japanese Patent Laid-Open Publication No. Hei 11-188535 disclosed yet another technique comprising an operation space provided between cabinets for each part, a loop type carrier provided in the operation space to support a vertically movable hanger for hanging a used-automobile and to transfer the used-automobile to a plurality of operation stations at low speed, and a carriage with stopper, for justifying the used-automobile carried in the hanger to locate at a given set position of the used-automobile and serving as an operation table for disassembling doors, front wind shield grass or the like by use of a balancer, wherein the hanger is sequentially moved to the plurality of operation stations by the loop type carrier, and each desired recyclable part is disassembled in each operation station and stored in the given part cabinet after rinsed and inspected.

Further, Japanese Patent Laid-Open Publication No. Hei 10-16841 previously filed by the applicant discloses a technique comprising a transfer device using an overhead type hoist crane for moving between scrapping stations to transfer a used-automobile with hanging the used-automobile thereon, a body rolling device provided in a functional part collecting station for disassembling or retrieving functional parts such as engine, wherein electric parts such as motors, and harnesses, instrument panels, or the like which has been regarded as non-recyclable parts are disassembled and removed from a body, whereby the content of copper and tin is lessened down to an allowable value or less to allow the scrap pressed article formed from the body iron to be available for a raw material of steel sheet having a high commercial value, and undesirable materials are reduced after shredding the body iron.

When such disassembling/removing operations are carried out in a flow system, it is necessary for used-automobiles carried in the line in sequence to be processed one by one sequentially in each scrapping station. If each scrapping station has different workload levels, undesirable holding time can arise in some scraping station, resulting in a degraded operation efficient.

In the aforementioned Japanese Patent Laid-Open Publication No. Hei 10-230822, dominant recyclable parts, such as doors, bumpers, fenders and the like, are collected in other parts collecting station as a final scrapping process, while in the aforementioned Japanese Patent Laid-Open Publication No. Hei 11-78810, the liquid extracting operation is separated from the recyclable parts disassembling operation. However, no solution of the above problem may be provided by these techniques.

Each of the aforementioned Japanese Patent Laid-Open Publication No. Hei 10-16840, 11-188535 and 10-16841 intends to equalize workload in each scraping station by dividing the recyclable parts collecting operation into a plurality of scrapping stations, these technique cannot be provide a sufficient solution. Further, while the Japanese Patent Laid-Open Publication No. Hei 10-16840 may increase the number of used-automobiles to be processed by providing a plurality of scrapping lines, the above problem will be remained in situ.

In the Japanese Patent Laid-Open Publication No. Hei 10-16840, some discriminative marker is attached on each collected recyclable part and transferred onto the conveyer to carry it out of the scrapping line. However, it is necessary to sort the collected parts based on the marker at a terminal end of the scrapping line. In case of using box-like pallets provided on a chain conveyer to carry the collected parts out of the scrapping line sequentially, the load on the chain conveyer can be undesirably destabilized due to the variance of the stored amount or weight of the collected parts in each pallet.

Furthermore, in sophisticated equipments such as the transfer carriage having the vertically movable fork member in the Japanese Patent Laid-Open Publication No. Hei 10-16840 or the loop type carrier having the vertically movable hanger in the Japanese Patent Laid-Open Publication No. Hei 11-188535, their equipment cost is inevitably increased, and it is required to maintain and check out them by a full-time staff to assure their smooth operation, which causes questions of economic viability in disassembling/removing operations.

SUMMARY OF THE INVENTION

In view of the aforementioned problems, it is an object of the present invention to provide an effective method and equipment of disassembling/removing operations, capable of enhancing scrapping efficiency and parts collection rate with an acceptable level of lowered undesirable materials against environment as well as a lessened equipment cost, by reviewing the current recycling method of used-automobiles and applying a new flow system to carry out operations based on each segment divided into parts recycling, material recycling and thermal recycling.

In order to achieve the above object, the present invention provides a recycling method of used-automobiles, comprising the steps of collecting reusable parts including exterior parts from a used-automobile, collecting liquid including fuel, oil and coolant from the used-automobile, prearranging to facilitate subsequent collecting operations, collecting functional parts including glass, engine and suspension from the used-automobile, collecting non-ferrous metal parts and resin parts from the used-automobile, and pressing a body of the used-automobile which has been subjected to said steps, wherein said steps are sequentially carried out, whereby a highly efficient collection and removal of subject parts of the used-automobile is provided to achieve a high recycling rate without any shredding operation.

In another aspect of the present invention, there is provided a recycling equipment having an effective arrangement of a plurality of apparatuses comprising a liquid extracting apparatus having a table vertically movable with placing a used-automobile thereon, a prearrangement apparatus having a pedestal for a body of the used-automobile, a functional parts collecting apparatus having a vertically rotatable table, a non-ferrous metal parts collecting apparatus, a pressing apparatus, and a transfer apparatus traveling between said apparatuses.

The functional parts collecting apparatus may include a glass collecting device having an openable/closeable door. The functional parts collecting apparatus may be additionally provided with functions to allow the transfer apparatus to forereach a preceding used-automobile, and to allow the body to be held in a state parallel to a operation floor in the horizontal traveling direction of the body. Further, a collected parts storing pallet may be provided close to both sides of the scrapping line, and the operation floor is arranged at the height of the collected parts storing pallet.

According to the present invention, the collecting operations of recyclable parts are adapted to carry out in parallel with the disassembling and removing operations so that a smooth operation flow may be maintained in the scrapping line. In addition, a processed used-automobile may forereach a preceding used-automobile to be transferred to next station by the transfer apparatus, which may provide efficient scrapping operations.

Further, the present invention may realize a high degree of material sorting and thereby a high level of recycle ratio may be readily achieved. Thus, direct reuse of parts, reclamation represented by iron scrap, heat application using burnable resin, oil or the like, and chemical recycling using a specific rpsin may be facilitated.

Furthermore, in the present invention, electric parts including harnesses is also collected and sorted. Thus, 0.2 to 0.04 mass % of Cu content and 0.01 to 0.0013 mass % of Sn content, based on 100 mass % of total metal weight remained in the used-automobile may be achieved, and non-ferrous metal remained in the used-automobile is significantly lessened, so that the pressed article obtained by pressing the body iron may be used directly in steel furnaces as an iron scrap.

Generally, shredding operation is carried out for sorting. In the present invention, since a high degree of sorting is carried out in the disassembling and removing operations, the shredding operation may be eliminated, and the pressed article may be directly recycled for steel making. This provides a significantly simplified operation process and a reduced energy for recycling used-automobiles.

Even if the pressed article according to the present invention is shredded, since non-ferrous material parts are sufficiently removed, the shredded material may be used for steel making without any difficulty. In addition, shredder dust involved in the shredding operation, eluted amount of lead may be insignificant, which provides a desirably reduced adverse affect against environment Other features and advantages of the present invention will be apparent from the accompanying drawings and from the detailed description.

BRIEF DESCRIPTION OF THE DRAWINGS

FIG. 3 shows a liquid collecting apparatus, wherein

FIG. 4 shows a transfer apparatus, wherein

FIG. 5 shows a functional parts collecting apparatus, wherein

FIG. 7 shows a non-ferrous metal parts collecting apparatus, wherein

DESCRIPTION OF THE PREFERRED EMBODIMENT

Figure 1:
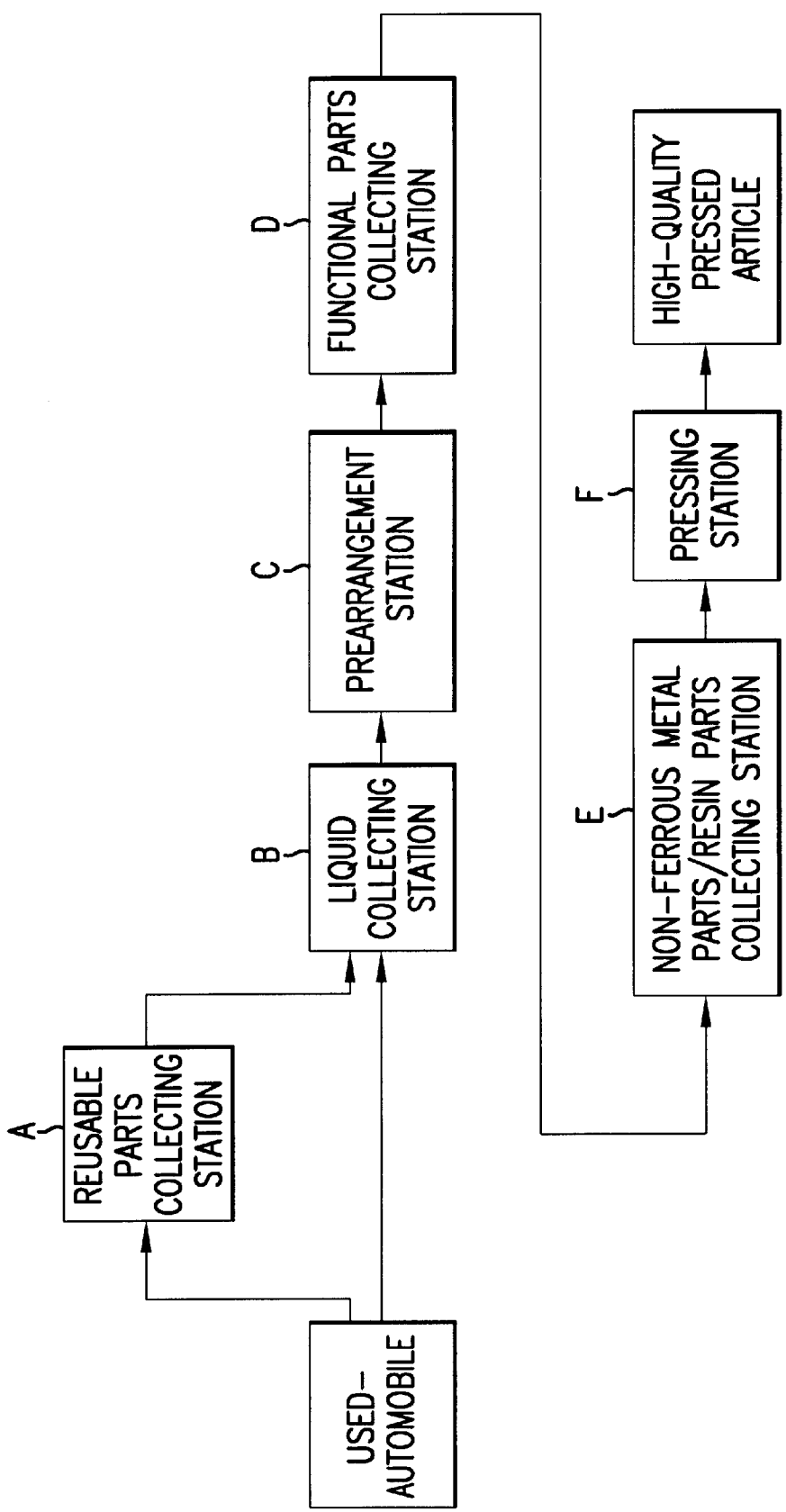
FIG. 1 is a diagram showing an operation process of a method according to the present invention.

FIG. 1 is a diagram showing an operation process of a method according to the present invention. In this figure, provided used-automobiles are sorted into subject used-automobiles and non-subject used-automobiles to parts recycling. In a reusable parts collecting station A, exterior parts, such as doors, fenders, bumpers, hoods and the like, which may be detached in regular parked state are disassembled and removed from the subject used-automobiles to parts recycling, and stored before shipped as recyclable parts.

A plurality of the used-automobile after disassembling and removing the reusable exterior parts and other used-automobiles are transferred to a liquid collection station B in a disassembling/removing operation area (hereinafter referred to as "scrapping line"), by driving them if they can run or by carrying with a suitable cargo vehicle such as forklift if they cannot run. In the liquid collecting station B, various liquids, such as fuel, oil and coolant, which involves problems of causing high-risk fire or degraded operation performances in subsequent process and has high potential in recycling when accumulated, are extracted and collected by opening discharge valves of storage containers storing them or boring a hole in the storage container and then receiving with a tray or sucked with a suction pump.

The used-automobiles after extracting the liquids are transferred to a subsequent prearrangement station C. Hereat, for example, the used-automobile capable of running or incapable of running due to dead battery, engine troubles, accidental damage generally has a relatively lager amount of remained fuel, while other used-automobile incapable of running generally has relatively small amount of remained fuel. As a result, the time for extracting the liquids in the previous liquid collection station B is varied for each used-automobile due to the difference in the remained liquid amount for each used-automobile. Thus, the used-automobiles are transferred to the prearrangement station C sequentially in order of the completion of extracting the liquids by a transfer apparatus. In the prearrangement station C, Freon (chlorofluorocarbon) used as cooling medium is extracted and collected from the plurality of used-automobiles carried-in by a suction pump of a Freon collecting device. In addition, thermal-recycling subjects of resin materials, such as seats, carpets and interior equipment, and material-recycling subjects, such as door linings, batteries, tires, and windshield are disassembled and collected as pre-collected parts in order to facilitate subsequent operations.

Then, the used-automobile is transferred from the prearrangement station C to a subsequent functional parts collecting station D to disassemble functional parts, such as engines, mufflers, drive shafts, suspension device including lower arms. In addition, side and rear glasses are also disassembled and collected. Most of collected parts in this process belong to the material-recycling subjects. The collected parts formed of aluminum alloy such as engines will be advantageously introduced into a melting furnace to provide aluminum ingots which have a reasonable commercial value. In this station, the collecting and removing operation may be carried out by use of a relatively large automatic tool. Thus, the used-automobile is carried in from the previous station one by one at each completion of the operation of the functional parts collecting station D.

Then, the used-automobile is transferred to a subsequent non-ferrous metal and resin parts collecting station E to disassembly and collect electric parts, such as harnesses and motors. Further, resin-covered parts and resin parts, such as instrument panels and parts associated with an air conditioner including air ducts and covers, and non-ferrous metal parts such as metal bumpers which have not been removed in the previous stations. The instrument panels or metal bumpers may be collected in the prearrangement station C to provide a lowered workload in this station E. The collected non-ferrous metal parts and a specific parts including copper wires or the like such as harnesses and motor are sorted for each kind and stored to utilize as the material-recycling subjects, and other collected pats will be processed as the thermal-recycling subjects.

In this process, while the disassembling and removing operation for harness arranged under the carpets and through body members is auxiliary jigs, most part of the operation depends on manpower, and thereby this operation is generally required to take the longest time in the scrapping line. Thus, this station is preferably to have a sufficient area to allow a plurality of subject used-automobiles to be arranged in series.

Then, the bared body of the used-automobile is transferred to a pressing station F. In this station, the body is processed with 3-directional press or 2-directional light-pressure press to provide a high quality pressed article available as a raw material for steel sheet in steel making, and this pressed article will be stored as the material-recycling subjects before shipping.

Demands or orders to recyclable parts successively exist. Thus, it will be apparent that even if some reusable parts could not be collected in the reusable parts collecting station A or the parts defined as the material-recycling subjects could not be collected in each station, due to a particular operating condition in the scrapping line, any parts defined as the recyclable parts in an operating instruction are adapted to be collected at a suitable subsequent station.

Even if the corrected parts are categorized into the recyclable parts, it is senseless to sort, disassemble and collect without demand. In the present circumstances, since most collected pars cannot be done in any other way but reused for material recycling or thermal recycling, the parts to be collected may be handled relatively roughly in the disassembly and removing operations without significant problems. Thus, the workload in the scrapping line based on the flow system may be equalized by adjusting the transfer to the station in which relatively large automatic tools may be applied and by collecting primary recyclable parts in the outside of the scrapping line.

Figure 2:
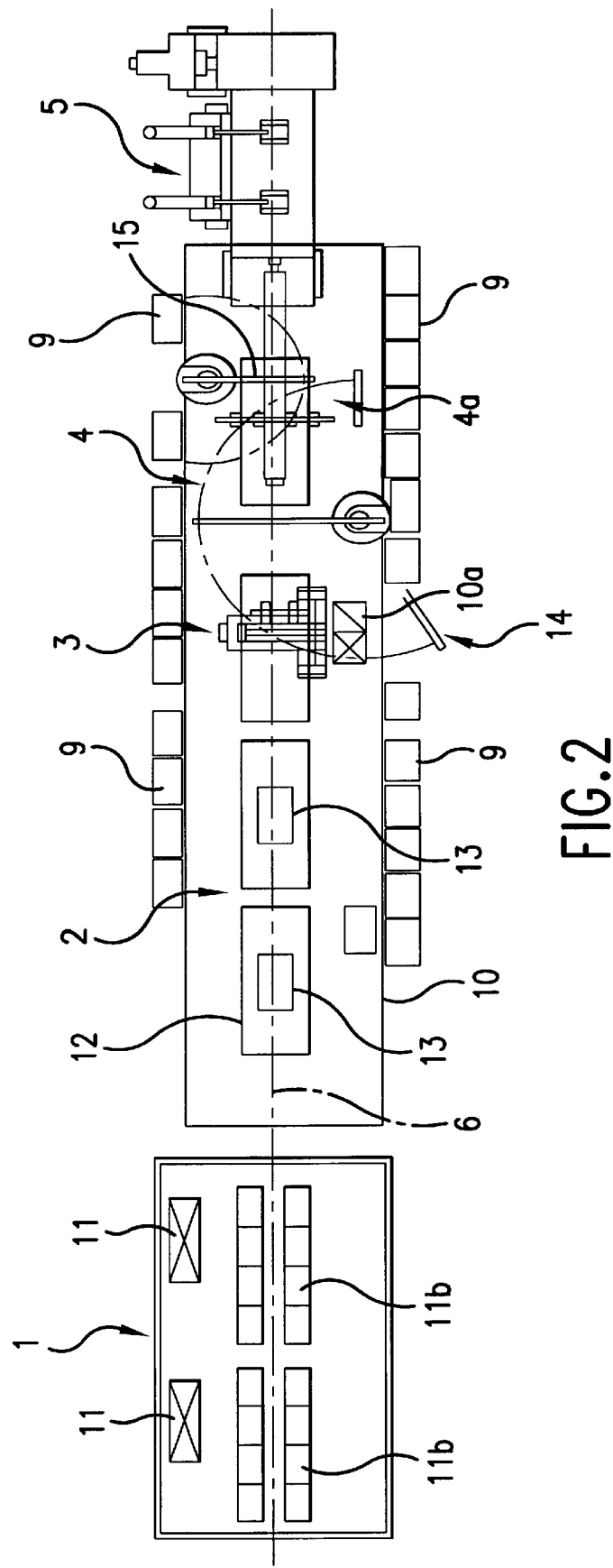
FIG. 2 is a schematic diagram showing an arrangement of an equipment according to the present invention.

FIG. 2 is a schematic diagram showing an arrangement of an equipment according to the present invention for implementing the operation process shown in FIG. 1. This equipment comprises a liquid collecting apparatus 1, a prearrangement apparatus 2, a functional parts collecting apparatus 3, non-ferrous metal parts collecting apparatus 4, and a pressing apparatus 5, wherein these apparatuses are arranged in series. The used-automobile or body 12 is transferred between each apparatus by a pair of transfer apparatuses 7, 8 each having a hoist crane traveling along a rail 6 provided in a ceiling parallel with the scrapping line. A plurality of pallets 9 are arranged on both sides of the scrapping line to store the collected parts. An operation floor 10 is set in the same height as that of the pallets 9 for storing the collected parts to allow the collected parts to be readily put in the pallets 9. The pressing apparatus 5 may be a hydraulic shearing machine.

At least one line of the pallets may be disposed close to one wall of a plant housing the equipment, and the wall may be configured to be openable/closeable by shutter or the like to handle the collected parts in the outside of the plant, which allow the inner space of the plant to be reduced.

Figure 3A:
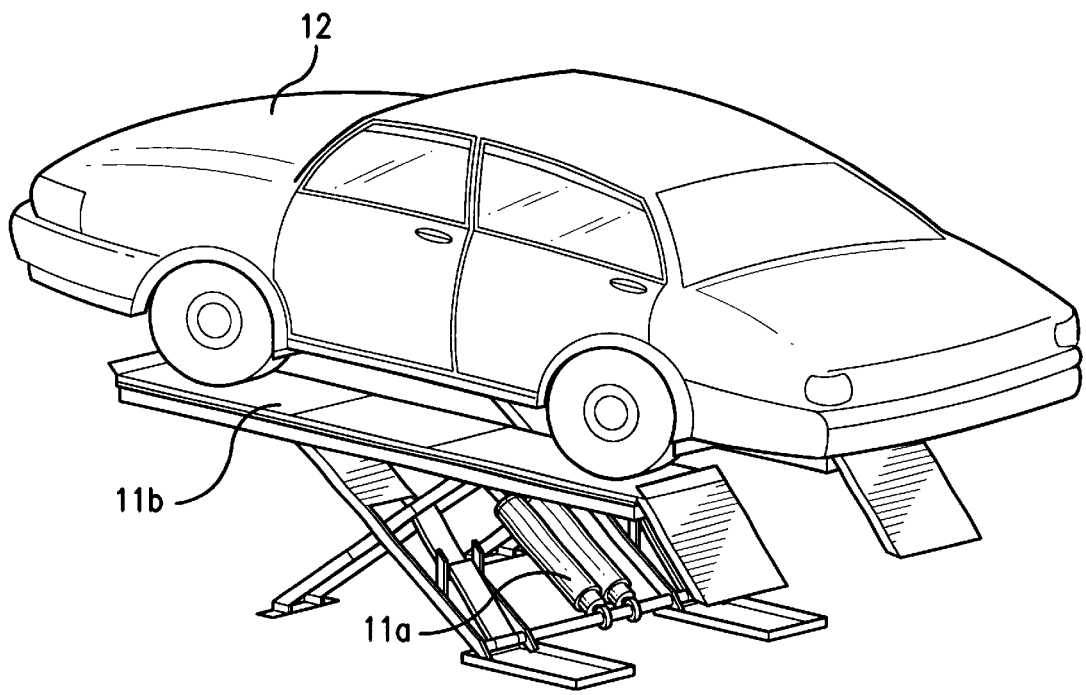
FIG. 3(a) is a schematic perspective view of a table in the liquid collecting apparatus and FIG. 3(b) is a front view of a liquid extracting device in the liquid collecting apparatus.
Figure 3B:
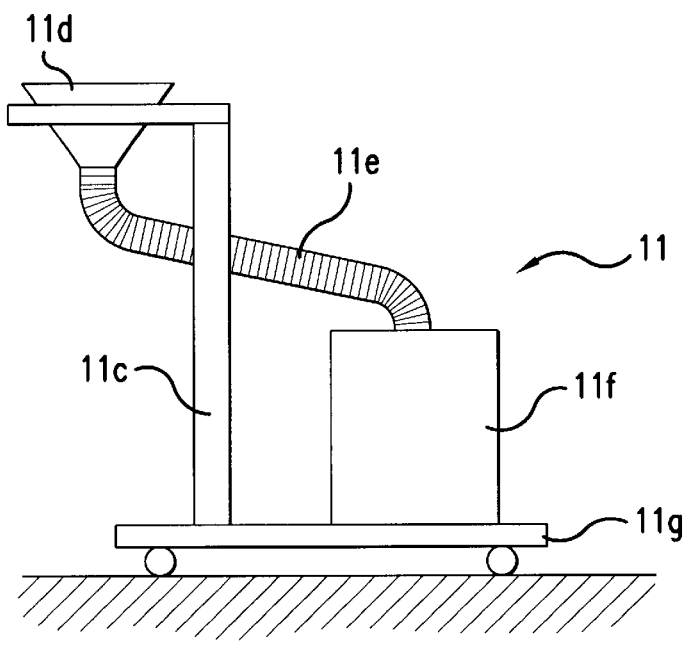

FIG. 3(*a*) is a schematic perspective view of a table in the liquid collecting apparatus 1 and FIG. 3(*b*) is a front view of a liquid extracting device in the liquid collecting apparatus. This embodiment includes a pair of liquid extracting devices 11. Two sets of pantographic tables 11*b* vertically driven by two cylinders are provided to place the used-automobile. A liquid collecting tray 11*d* supported by a supporting column 11*c* is provided close to the table 11*b*. The liquid collecting tray 11*d* is connected to a liquid collecting container 11*f* through a flexible hose 11*e*. The supporting column 11*c*, liquid collecting tray 11*d* and liquid collecting container 11*f* are placed on a carriage 11*g* to move under a subject containing liquid to be extracted, such as fuel tank, when the used-automobile placed on the table 11*b* is moved upward.

Figure 4A:
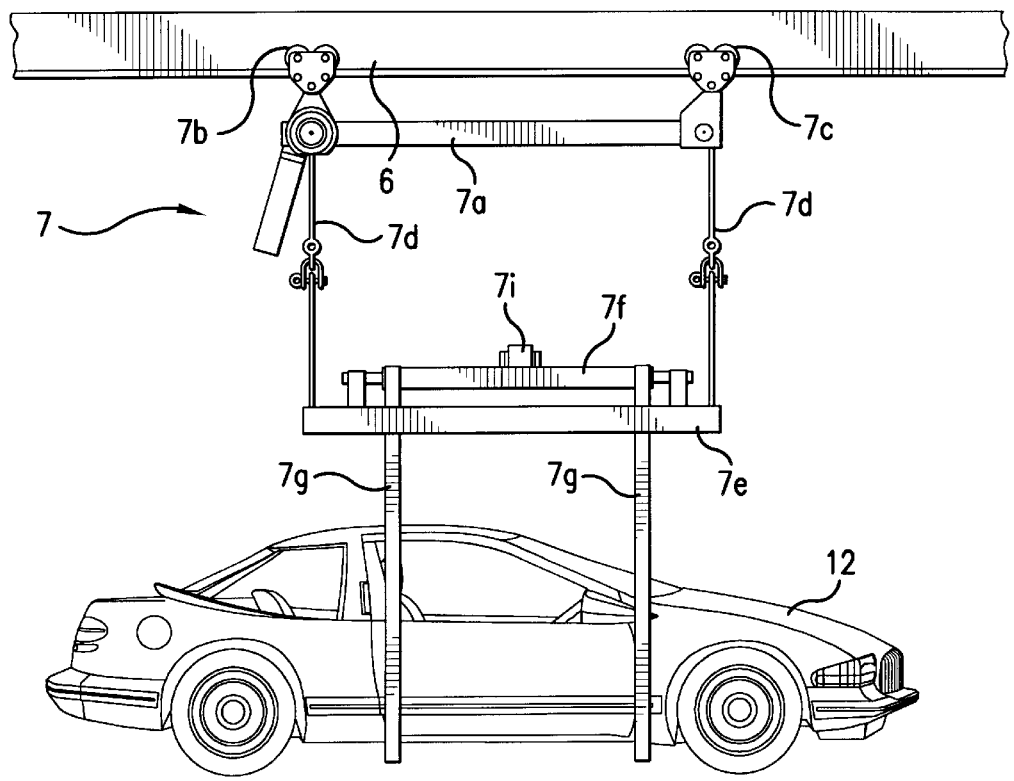
FIG. 4(a) is a front view of the transfer apparatus for transferring an used-automobile.
Figure 4B:
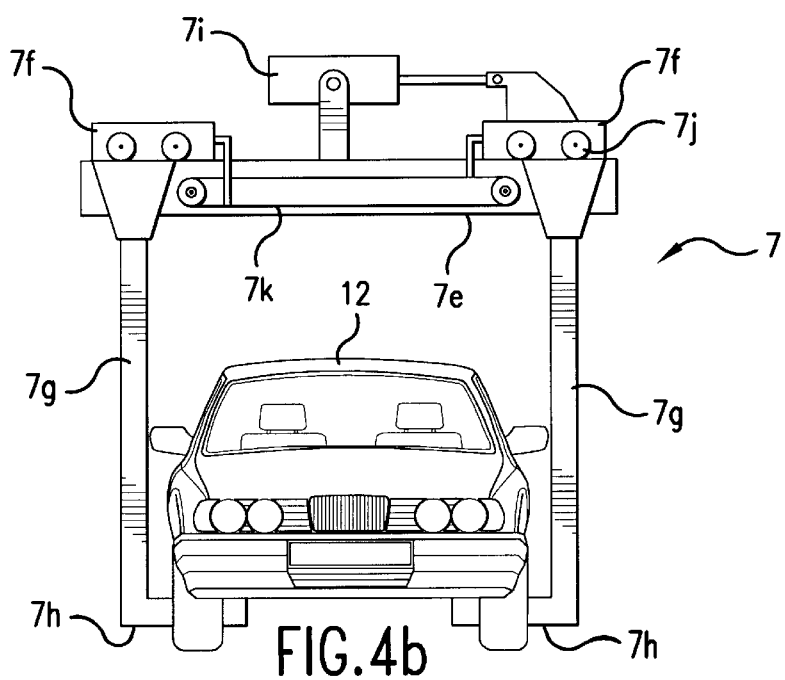
FIG. 4(b) is an explanatory view of the motion of a tongue in the transfer apparatus.

FIG. 4(*a*) is a front view of the transfer apparatus 7 for transferring an used-automobile 12, and FIG. 4(*b*) is an explanatory view of the motion of a tongue in the transfer apparatus. This transfer apparatus 7 is used mainly for transferring the used-automobile 12 between the liquid collecting apparatus 1 and the functional parts collecting apparatus 3. In the transfer apparatus 7, a traveling carriage 7*b*, which is driven by a driving motor and travels with holding both sides of the rail 6, and a follower carriage 7*c* are provided on both sides of a guide frame 7*a*. A frame 7*e* is supported at the both sides of the guide frame 7*a* by chains vertically moved by a vertically driving motor. A pair of roller frames 7*f* are supported by the frame 7*e* through rollers 7*j* to allow each roller frame 7*f* to be movable in the direction orthogonal to the scrapping line. Each roller frame 7*f* is fixed to top ends of a pair of tongues 7*g*, and each pair of tongues 7*g* are opposed to each other. A supporting hook 7*h* is provided in each lower end of the four tongues 7*g* to support side sills of the used-automobile from underneath. This transfer apparatus 7 allows a used-automobile 12, in which the liquid collecting operation in the liquid collecting apparatus 1 has been finished, to overreach a preceding used-automobile 12, in which the liquid collecting operation has not been finished, so as to transfer said used-automobile 12, in which the liquid collecting operation has been finished, to the prearrangement apparatus 2, or allows a used-automobile 12, in which the collecting operation in the prearrangement apparatus 2 has been finished, to overreach a preceding used-automobile 12, in which the collecting operation has not been finished, so as to transfer said used-automobile 12, in which the collecting operation has been finished, to the functional parts collecting apparatus 2.

In FIG. 4(*b*), on of the roller frames 7*f* is connected to a cylinder 7*i* supported by the frame 7*e* so as to move the tongues 7*g* with respect to the used-automobile. A wire 7*k* is wound around rollers provided on the frame 7*e* to form a loop, and roller frames 7*f* are fixed to the upper and lower sides of the wire 7*k*, respectively. Thus, in response to the reverse movement in the upper and lower sides of the wire 7*k*, the opposed pair of tongues 7*g* may be moved in sync with each other to allow the each pair of tongues to be moved in the direction close to and apart from the used-automobile 12.

Figure 5A:
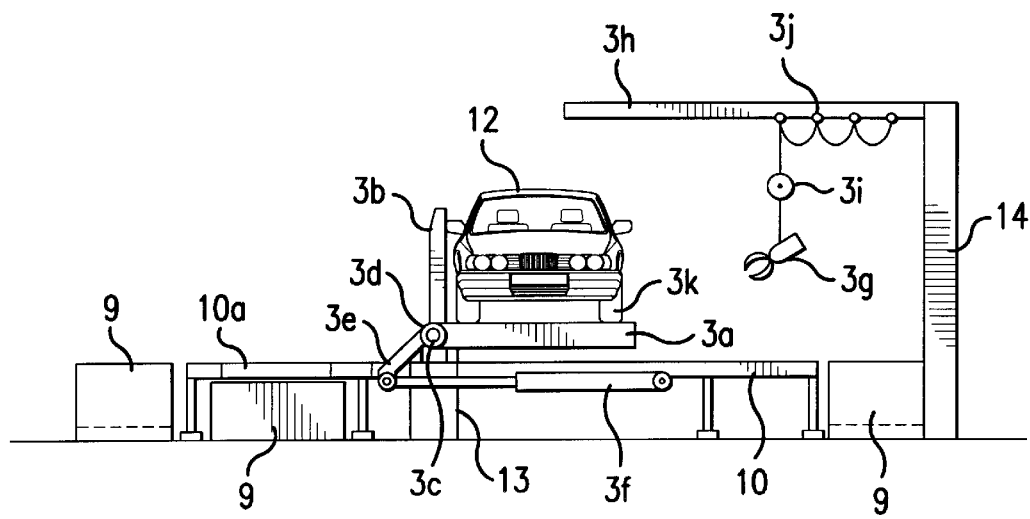
FIG. 5(a) is a side view of the functional parts collecting apparatus.
Figure 5B:
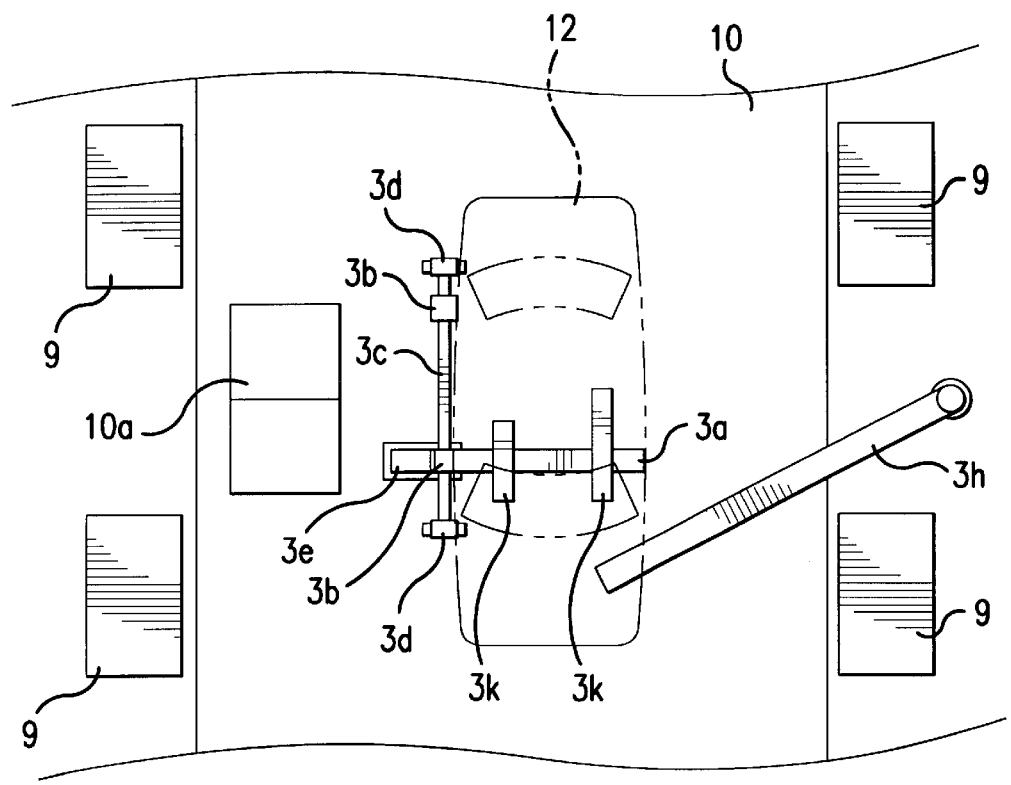
FIG. 5(b) is a top plan view of a vertically rotatable table in the functional parts collecting apparatus.

FIG. 5(*a*) is a side view of the functional parts collecting apparatus 3, and FIG. 5(*b*) is a top plan view of a vertically rotatable table in the functional parts collecting apparatus 3. The functional parts collecting apparatus 3 is provided with the vertically rotatable table 3*a* having a body receiving member 3*k* on which the used-automobile is placed. A stopper member 3*b* is provided in one end of the table 3*a* to form a L-shape with the table 3*a* and restrain the movement the used-automobile. The stopper member 3*b* includes a pivot shaft 3*c* supported by a bearing 3*d* fixed to a supporting column 13. One end of a table lower arm 3*e* extending obliquely downward is fixed to the pivot shaft 3*c*, and another end of a table lower arm 3*e* is connected to an electrically operated cylinder 3*f*. When the table lower arm 3*e* is pulled by the electrically operated cylinder 3*f*, the table 3*a* is rotated upward to make the used-automobile 12 placed thereon turn over and lie on its side. In order to collect an engine, suspension device and the like, the functional parts collecting apparatus 3 includes a machine tool, such as a hydraulic cutter 3*g*, which is movably attached to a supporting arm 3*h* rotatably supported by the upper section of a supporting column 14 through a balancer 3*i* and a pulley 3*j*. A hydraulic cylinder may be used as a substitute for an electrically operated cylinder 3*f*.

Figure 6:
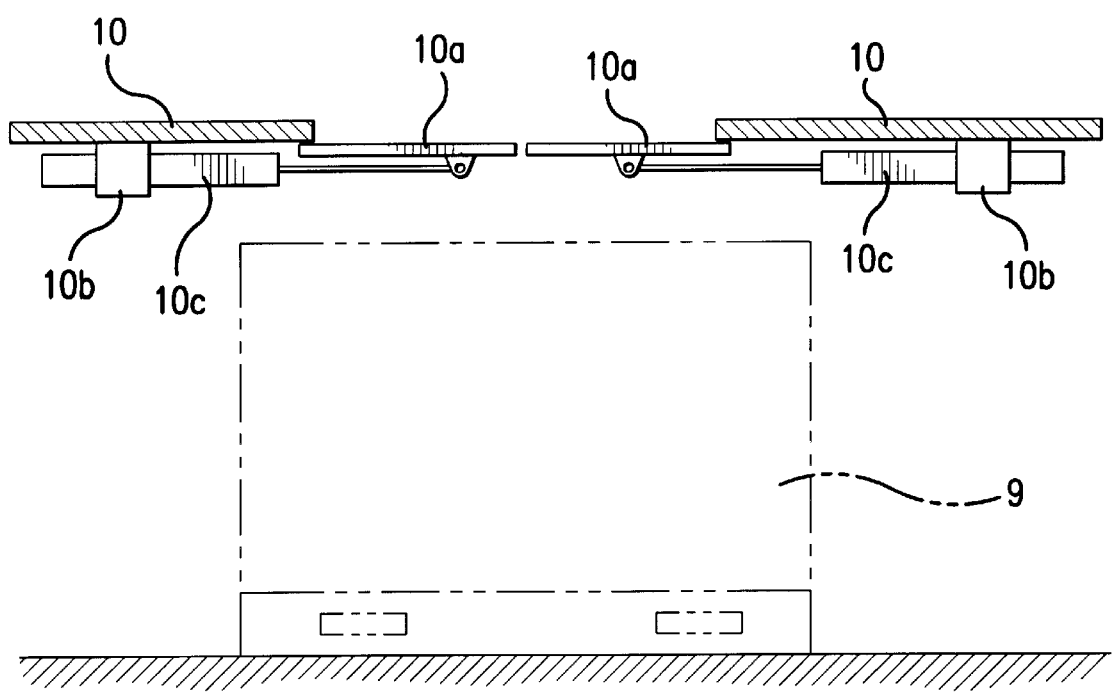
FIG. 6 is schematic front view of an openable/closeable gate provided in an operation floor of the functional parts collecting apparatus.

FIG. 6 is schematic front view of an openable/closeable gate provided in an operation floor 10 of the functional parts collecting apparatus 3. The operation floor 10 of the functional parts collecting apparatus 3 is provided with the openable/closeable gate 10*a*. After disassembling and crashing rear and side glasses in the state when the used-automobile 12 is turned over, such rear and side glasses are put in a pallet 9 disposed under the operation floor 10 through the openable/closeable gate 10*a*. The openable/closeable gate 10*a* is opened in the form of a double door by a pair of air cylinders 10*c* which are fixed on the back surface of the operation floor 10 with cylinder fixtures 10*b*.

Figure 7A:
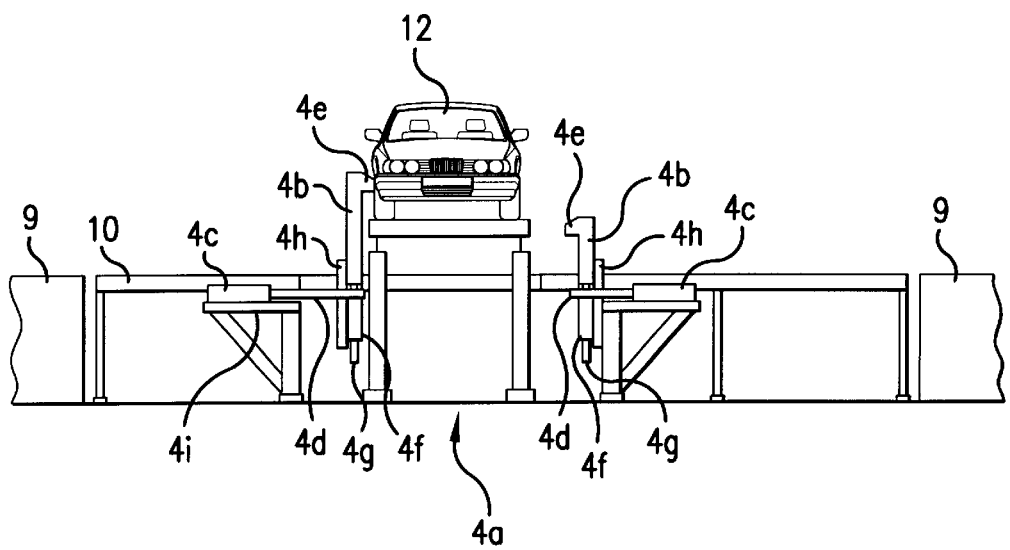
FIG. 7(a) is a side view of a body stabilizing device in the nonferrous metal parts collecting apparatus.
Figure 7B:
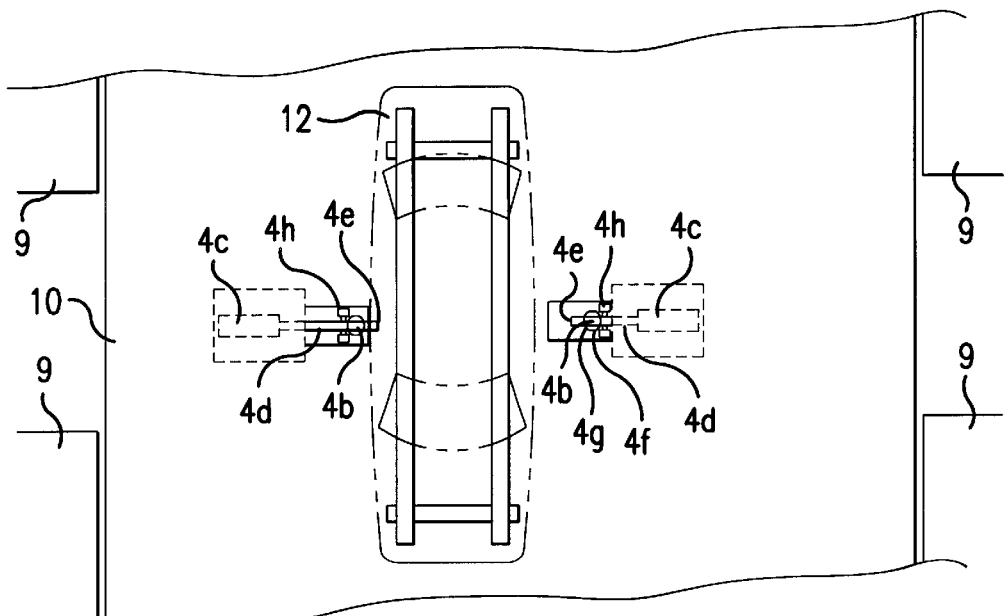
FIG. 7(b) is a top plan view of the same.

FIG. 7(*a*) is a side view of a body stabilizing device in the non-ferrous metal parts collecting apparatus 4, and FIG. 7(*b*) is a top plan view of the same. In these figures, the right side from the center of the used-automobile 12 shows a waiting state, while the left side from the center of the used-automobile 12 shows an operating state. In the body stabilizing device 4*a*, a pair of stabilizing arms 4*b* for stabilizing both sides of the used-automobile 12 are provided perpendicular to supporting members 4*d*, respectively. Each supporting member 4*d* is slidably moved by an electrically operated cylinder 4*c* provided on a stand 4*i*. A L-shaped stabilizing claw 4*e* is formed in the top end of each stabilizing arm 4*b* with directing toward the body of the used-automobile. Each stabilizing arm 4*a* is supported by a guide rod 4*g* slidably moved within a sleeve 4*f* of the supporting member 4*d*, and each stabilizing arm 4*a* is also fixed to an electrically operated cylinder 4*h* provided perpendicular to the supporting member 4*d*. The supporting members 4*d* are slidably moved by actuating the corresponding electrically operated cylinders 4*c* to move the corresponding stabilizing arms 4*b* back and forth, and the stabilizing arms 4*b* are vertically moved by actuating the corresponding electrically operated cylinders 4*h*, so that the stabilizing claws 4*e* are engaged with the body of the used-automobile 12 to stabilize the used-automobile 12.

Figure 8:
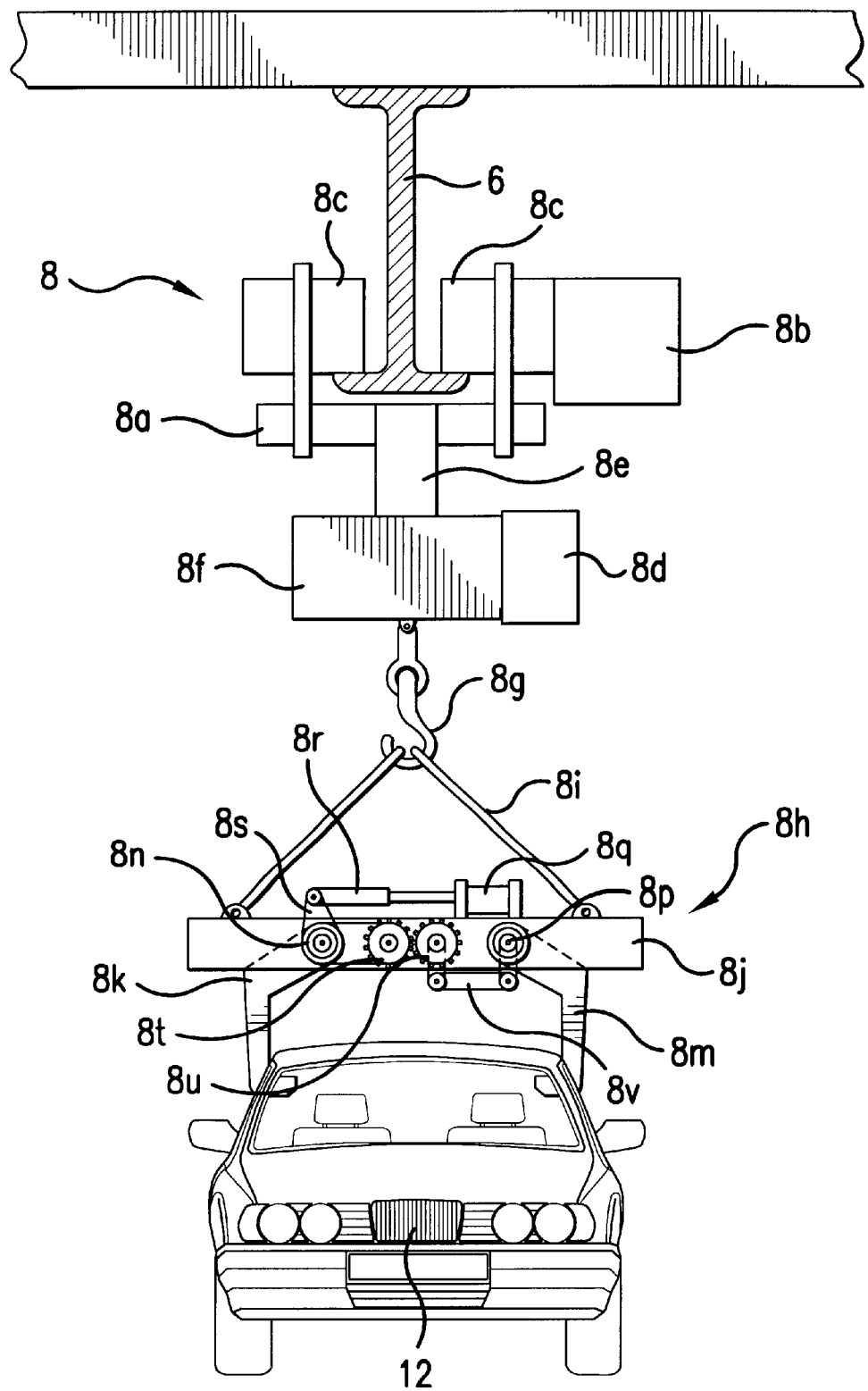
FIG. 8 is a schematic side view showing a transfer apparatus used in transferring a body of a used-automobile to a pressing apparatus.

FIG. 8 is a schematic side view showing a transfer apparatus 8 used in transferring a body of a used-automobile to the pressing apparatus 8. The transfer apparatus 8 is mainly used for transferring the body 12 between the functional parts collecting apparatus 4 and the pressing apparatus 5. The transfer apparatus 8 is provided with traveling wheels 8*c* attached to a tie-rod. The traveling wheels 8*c* is driven by a driving motor 8*b* and travels with holding both sides of the rail 6. A hoist 8*f* is supported by the tie-rod 8*a* through a fitting 8*e*, and the hoist 8*f* is vertically moved by a vertically driving motor 8*d*. A hanging device 8*h* is supported by a hook 8g of the hoist 8f through a stay 8i. A pair of openable/closeable hanging arms 8k, 8m are provided opposed to each other and rotatably attached to a beam 8j of the hanging device 8h through bearings 8n, 8p. One of the hanging arms, i.e. the hanging arm 8k, is connected to the end of a rod 8r of an air cylinder 8q through a crank 8s, while another hanging arm 8m is connected to a gear 8u through a link device 8v. A gear 8t is coupled with a gear fixed to the bearing 8n through a chain, and the gear 8t is rotated in response to the movement of the rod 8r of the air cylinder 8q. The gear 8u is engaged with the gear 8t. The hanging device 8h of the transfer 8 may cramp the upper section of the body 12 to transfer the body into a pressing room without any interference with the pressing apparatus 5.

One example of operation steps of the present invention will now be described. In the reusable parts collecting step, exterior parts, such as doors, fenders, bumpers and hoods of the used-automobiles subject to the parts recycling among used-automobiles carried-in are disassembled and removed. The used-automobile after collecting the recyclable exterior parts is transferred to the liquid collection apparatus 1 by driving the used-automobile if it can run or by carrying with a forklift if it cannot run. Then, as shown in FIG. 3, the transferred used-automobile is placed on the pantographic table 11b of the liquid collecting apparatus 1. When transferred by the forklift, the used-automobile is placed directly on the table 11b from the front side of the table 11b. After placing the used-automobile on the table 11b, the table 11b is moved upward. Fuel is collected by opening a drain plug of a fuel tank and then receiving with the liquid collecting tray 11d. In addition to fuel, oil, LLC (coolant) and the like are collected. These operations are simultaneously carried out. After these operations have been finished, the table 11b is moved down to the height of the ground.

Then, as shown in FIG. 4, after setting the tongues 7g of the transfer apparatus 7 to the body of the used-automobile 12, the used-automobile 12 is transferred to the prearrangement apparatus 2 and placed on support column 13 of the body of the used-automobile. The support column 13 has a height to allow tires to be disassembled. Each mount bolt or fitting of tires, seats, carpets, door lining, windshield, and the like is collected by use of an impact wrench, electric screwdriver or the like. The windshield is cut and collected by use of a pneumatic laminated-glass cutting tool or the like. Freon is sucked and collected by use of a Freon collecting device.

Then, as shown in FIG. 5, the front section including an engine room of the body of the used-automobile 12 is placed on the body receiving member 3k of the vertically rotatable table 3a by use of the transfer apparatus 7. After turning over the body of the used-automobile 12 by 90 degree, mount bolts for attaching a drive shaft, suspension device or the like to the bottom section of the used-automobile 12 are taken off by use of an impact wrench. Each connecting section of mufflers, lower arm and the like to the body is out by a hydraulic cutter, or associated bolts are taken off by an impact wrench to be collected.

Then, after turning back the body of the used-automobile at a horizontal position by rotating the table 3a downward, mount bolts of an engine are taken off to collect the engine by use of a jib crane 15. When the body of the used-automobile is then hung by the transfer apparatus 7, the drive shaft and other to be collected are separated from the body and left on the operation floor 10. The collected parts may be recyclable in both manner of direct reuse and reclamation as raw materials.

Then, the used-automobile 12 is transferred to the non-ferrous metal parts collecting apparatus 4 by use of the transfer apparatus 7. As shown in FIG. 7, the stabilizing arms 4b are moved by the hydraulic cylinders 4c, 4h to automatically stabilize the used-automobile. Then, non-ferrous metal parts or resin parts, such as motors, harnesses, instrument panels, and bumper, are hung and tone off by a hook of a jib crane 15 of the non-ferrous metal parts collecting apparatus 4 to be collected.

Then, the body 12 is transferred to the pressing apparatus 5 by use of the transfer apparatus 8 shown in FIG. 8 to press the body 12. The resulting pressed article includes few impurities, and is thereby recyclable as high quality iron scrap without using any shredding equipment. The body may be processed with 2 or 3-directional press as needed. After 2 directional press, the pressed article may be subjected to a shredding process to be recycled.

The iron scrap collected according to the present invention was molten in a high-frequency furnace, and primary components of impurities were analyzed. This result is shown in Table 1.

TABLE 1

| | P | S | Sn | Cu (mass %) |
|---|---|---|---|---|
| embodiment of the present invention conventional example | 0.013 | 0.016 | 0.0013 | 0.04 |
| used automobile initial stage | — | — | 0.028 | 0.35 |
| used automobile after shredding (large fragment) | — | — | 0.028 | 0.13 |
| used automobile after shredding (small fragment) | — | — | 0.029 | 1.03 |
| used automobile shredding processing | 0.025 | 0.037 | 0.010 | 0.23 |

Generally, an allowable level of Cu or Sn as a raw material for steel sheet in steel making is 0.06 to 0.1 mass % for Cu. Whereas conventional methods provide insufficient quality, the pressed article according to the present invention satisfies the allowable level of Cu and Sn. As a result, a recycled article as a raw material for steel may be provided without shredding the body of the used-automobile or the like.

Figure 9:
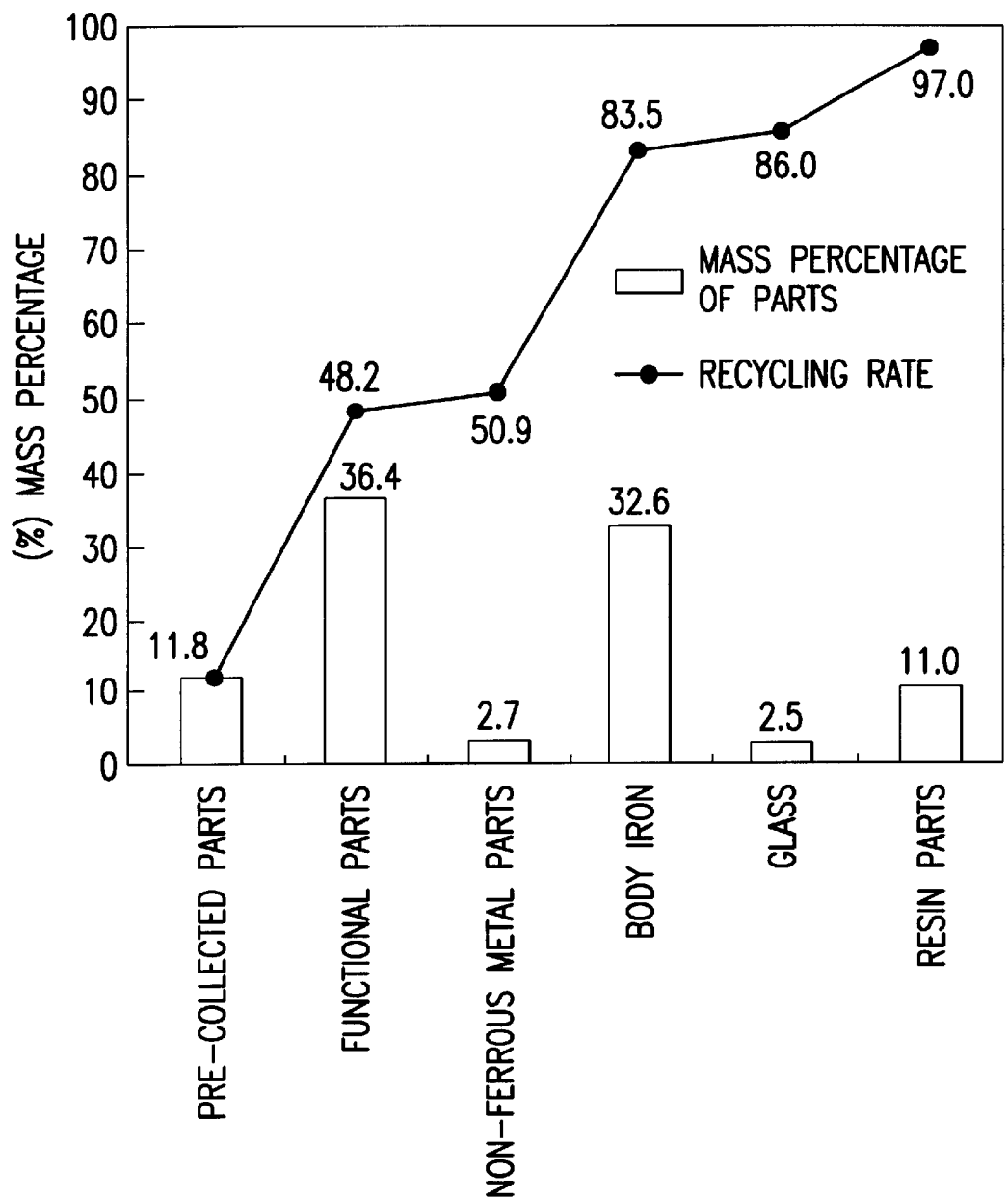
FIG. 9 shows a mass of each recyclable part collected by the method of the present invention.

FIG. 9 shows a mass of each recyclable part collected by the method of the present invention. Most of the functional parts and the body iron may be recycled as iron scraps, while the non-ferrous parts and the rear and side glasses may be recycled through the material recycling. While a part of the resin parts may be recycled through the material recycling, most of them may also be recycled through the thermal recycling. As a result, a recycling rate of 85 to 97 mass % may be achieved by additionally collecting the bumpers, instrument panels and other urethane parts or materials from the used-automobile.

In the present invention, recyclable parts are effectively collected by use of an equipment line arranged in series, and any recyclable parts which are directly reused as one component or unit may be collected in this equipment line. It is readily achieved to sort the collected parts into each category by storing parts of the same kind in a same pallet. Thus, workload of operators may be reduced, and this flexibility may facilitate to realize the high recycling rate of 85 to 97 mass %.

The remained 3% of parts or materials which cannot be collected by the scrapping operations include paint, undercoating, adhesive resin for windshield or the like. A commercially suitable method for collecting the paint, undercoating or the like has not been found, because they are closely associated with the body. The value of the body iron in FIG. 9 is shown by subtracting such paint, undercoating or the like.

The invention has now been explained with reference to specific embodiments. Other embodiments will be apparent to those of ordinary skill in the art. Therefore, it is not intended that the invention be limited, except as indicated by the appended claims, which form a part of this invention description.

What is claimed is:

1. A method of recycling used-automobiles, comprising the steps of:

collecting reusable parts including exterior parts from a used-automobile;

collecting liquid from said used-automobile;

prearranging the used automobile to facilitate subsequent collecting operations;

collecting functional parts from said used-automobile;

collecting non-ferrous metal parts and resin parts from said used-automobile to an extent such that a remaining Cu content is in a range of about 0.2 to about 0.04 weight percent and such that a remaining Sn content is in a range of about 0.01 to about 0.0013 weight percent based on 100 weight percent of total metal weight remaining in said used-automobile after said step of collecting non-ferrous metal parts; and pressing a body of said used-automobile which has been subjected to said steps, wherein said steps are sequentially carried out in a continuous straight line to directly recover collected parts and a body of the used-automobile without shredding of the used-automobile, and a recycling rate of said used-automobile yielded by said collected parts directly collected from said used-automobile and said body of said used-automobile after collecting parts is adapted to be in the range of 85 to 97 weight percent.

2. A method according to claim 1, wherein:

liquid collected in said step of collecting liquid includes fuel, oil and coolant from said used-automobile;

parts and materials recovered in said step of prearranging include chlorofluorocarbon, battery, seat, tire, windshield, and a portion of resin parts from said used-automobile;

functional parts collected in said step of collecting functional parts include rear and side glasses, engine and suspension from said used-automobile; and parts collected in said step of collecting non-ferrous metal parts and resin parts from said used-automobile include electric motors, inside panels and non-ferrous metal bumpers.

3. A method according to claim 1, further comprising:

sequentially arranging stations in an order of said steps to provide a scrapping line, said scrapping line including at least a prearranging station, a functional parts collecting station, and a non-ferrous metal parts and resin parts collecting station at which said steps of prearranging, collecting functional parts and collecting non-ferrous metal parts and resin parts are respectively carried out; and providing a sorting and storing station proximate to said scrapping line so as to sort and store parts or materials collected from said stations for each of said collected parts and materials.

4. A method according to claim 3, wherein:

said step of liquid collecting includes use of an apparatus for extracting liquid from a used-automobile, said liquid extracting apparatus having a vertically movable table upon which said used-automobile is placed; and said step of collecting functional parts includes a functional parts collecting apparatus having a vertically rotatable table which allows the used-automobile to be rotated into a position in which said used-automobile rests on a side thereof.

5. A method according to claim 3, further comprising transferring the used-automobile between said stations while supporting said used-automobile in an elevated position to hold a body of said used-automobile approximately parallel with the ground, thereby permitting the used vehicle to be moved ahead of a preceding used-automobile in said scrapping line.

6. A method according to claim 3, further comprising the steps of:

arranging a storing pallet proximate to opposite sides of said scrapping line and at a heigh approximately aligned with an operation floor of each of the stations; and storing parts collected at said stations in said storing pallet.

7. A method according to claim 1, wherein said step of collecting liquid includes:

placing the used automobile on a vertically movable table; and moving said vertically movable table in an upward direction.

8. A method according to claim 1, wherein said step of collecting functional parts includes:

placing said used-automobile on a vertically rotatable table pivotable about a horizontally disposed rotational axis; and rotating said vertically rotatable table along with said used-automobile about said rotational axis to a turned-over position in which a side of the used-auto mobile faces downwardly thereby permitting side access to an underside of the used-automobile.

9. A method according to claim 8, wherein said step of collecting functional parts further includes:

breaking rear and side windows of said used-automobile while said used-automobile is in said turned over position;

opening a gate below said used-automobile; and collecting broken glass of said side and rear windows which falls through said gate when open.

* * * * *